Patented Jan. 31, 1950

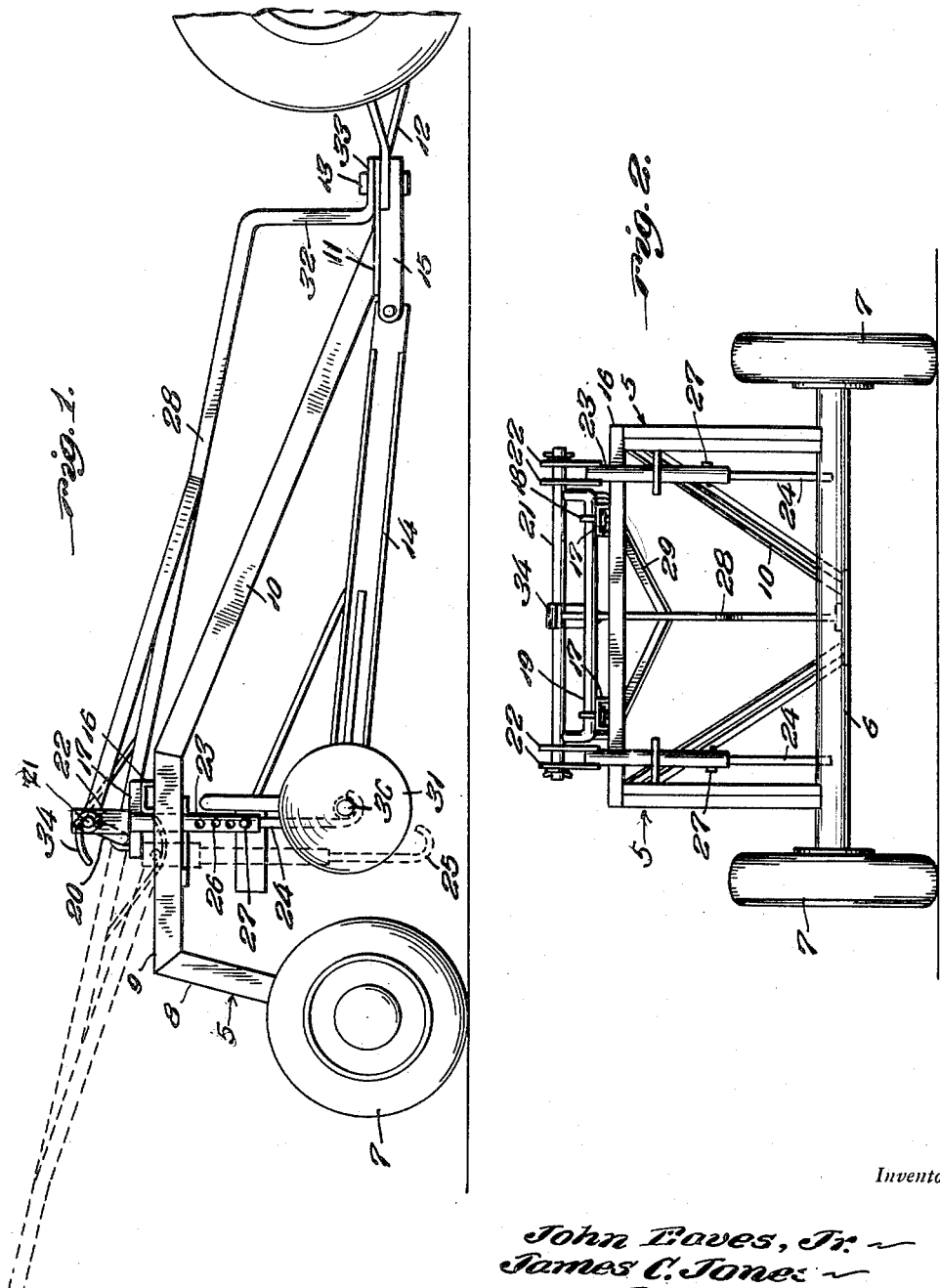

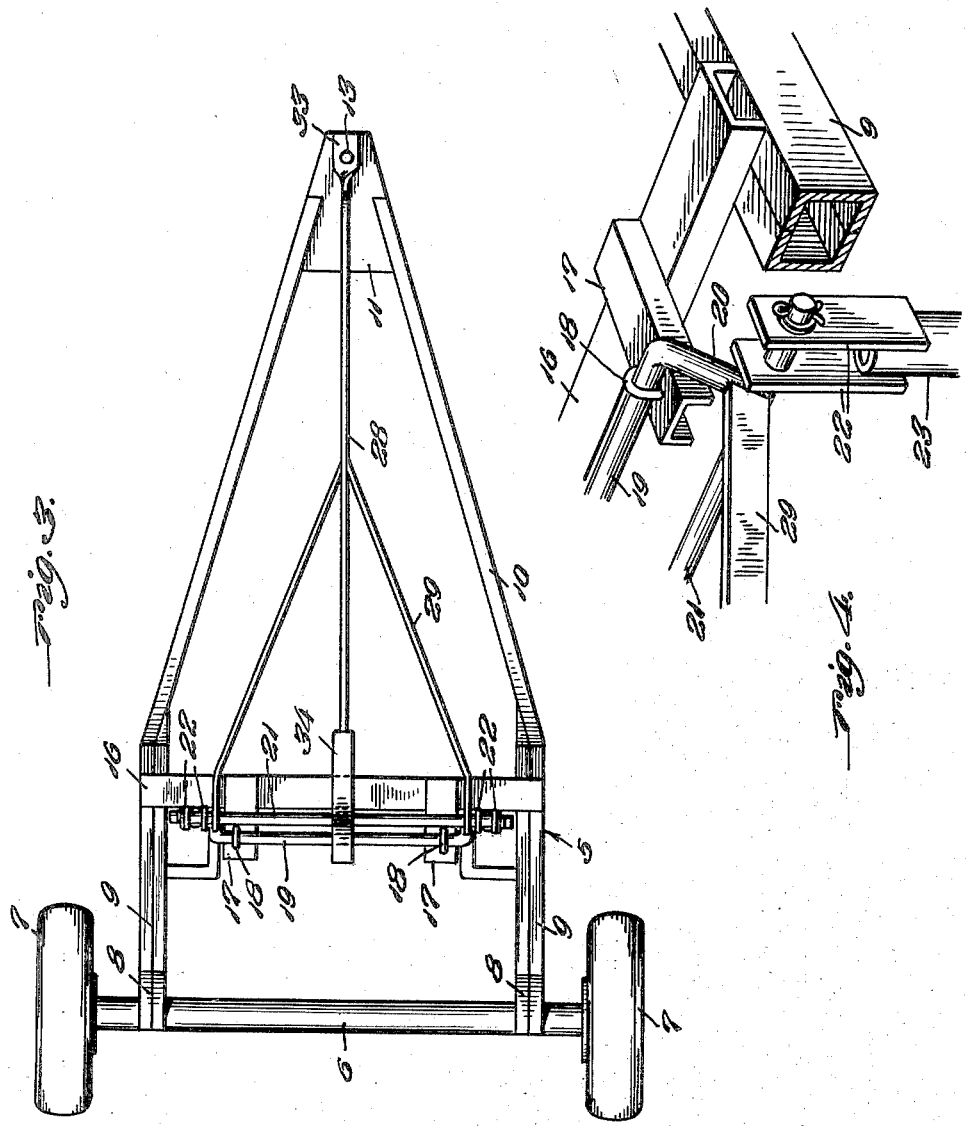

2,496,153

UNITED STATES PATENT OFFICE 2,496,153

HARROW ELEVATING AND TRANSPORTING TRAILER

John Eaves, Jr., and James C. Jones, Bremen, Ga.

Application February 19, 1946, Serial No. 648,639

3 Claims. (Cl. 214—65.3)

The present invention relates to new and useful improvements in devices for lifting and transporting tractor-drawn harrows to facilitate transporting of the harrow from place to place while not in use in working the soil.

An important object of the present invention is to provide a two-wheel trailer adapted for attaching to the draw bar of a tractor and embodying means for engaging and elevating a harrow also drawn by the tractor to support the harrow in a raised position to facilitate transporting thereof from place to place.

A further object of the invention is to provide a device of this character by means of which relatively heavy harrows may be lifted and secured in a raised position with comparatively little manual effort.

Another object of the invention is to provide a device of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view.

Figure 2 is a rear elevational view.

Figure 3 is a top plan view, and

Figure 4 is an enlarged fragmentary perspective view of one of the cranks for raising and lowering one of the lifting hooks of the device.

Referring now to the drawings in detail wherein for the purpose of illustration we have disclosed a preferred embodiment of the invention the numeral 5 designates a trailer generally which includes an axle 6 on which a pair of wheels 7 are journalled, the axle also having a pair of longitudinal frame members 8 extending upwardly therefrom adjacent the ends of the axle, the frame members 8 including horizontal forwardly extending portions 9 terminating in downwardly inclined extensions 10 converging toward their front ends and connected to each other by a plate 11 to provide a tongue for the trailer for connecting to a draw bar 12 of a tractor by means of a coupling pin 13. The draw bar 12 of the tractor is also adapted for attaching a conventional form of harrow 14 thereto by means of the coupling pin 13, the harrow including a hitch 15 to which the harrow frame is pivotally attached as will be apparent from an inspection of Figure 1 of the drawings.

A transverse frame member 16 is welded or otherwise suitably secured to the horizontal portions 9 of the frame members 8 and to which are welded or otherwise suitably secured a pair of rearwardly extending bearing brackets 17 each provided with a bearing 18 on its upper surface in which a transversely extending shaft 19 is journalled, the shaft resting on the bracket 17 as shown in Figure 4 of the drawings. The shaft 19 is formed at each end with a crank arm 20 welded or otherwise suitably secured at its end to a transversely extending bar 21 to the ends of which a pair of spaced parallel plates 22 are loosely pivoted. A tube 23 is welded or otherwise suitably secured between the lower ends of each pair of the plates 22, the tube being supported in a perpendicular position and having the shank 24 of a hook 25 slidably inserted in the lower end of the tube for vertical adjustment therein by means of the vertically spaced openings 26 in the tube adapted for selective insertion of a pin 27 therein carried by the shank 24.

A lever 28 has a forked rear end 29 welded or otherwise suitably secured to the crank arms 20 to rotate the shaft 19 whereby to raise or lower the hooks 25 by the vertical swinging movement of the lever 28.

When the lever 28 is swung into its rearwardly extended position as shown by the dotted lines in Figure 1 of the drawings the hooks 25 will be lowered into a position for engaging the axle 30 of the disc 31 of the harrow 14 and by swinging the lever 28 forwardly into the full line position as shown in Figure 1 the rear end of the harrow 14 will be raised out of contact with the ground.

The front end of the lever 28 is bent angularly downwardly as shown at 32 and terminates in an apertured plate 33 for receiving the coupling pin 13 of the draw bar 12 of the tractor whereby to secure the lever in its forward position and with the harrow 14 supported in an elevated position to thus conveniently transport the harrow from place to place while not in use.

A bar 34 is attached at one end to the lever 28 and is curved over the bar 21 with the free end of the bar 34 adapted to strike the transverse member 16 when the lever is swung rearwardly into the position as shown by the dotted lines in Figure 1 to function as a stop to limit rearward swinging movement of the lever.

What we claim as our invention is:

1. A trailer comprising a wheeled frame engageable with a towing vehicle, a crank shaft journalled transversely of the frame and including a crank portion, an object engaging hook carried by the crank portion of the shaft for raising and lowering movement by the shaft, a lever attached to the crank shaft for manually operating the shaft, and means removably securing the lever to the frame for normally holding the hook in a raised position.

2. A trailer comprising a wheeled frame including a forward end engageable with a towing vehicle, a crank shaft journalled transversely of the frame and including a crank portion, an object engaging hook carried by the crank portion of the shaft for raising and lowering movement by the crank shaft, a lever fixed at one end to the crank shaft for manually operating the crank shaft, said lever having a vertical forwardly and rearwardly swinging movement, means for limiting the rearward swinging movement of the lever, and means for securing the free end of the lever to the forward end of the frame to normally retain the object engaging hook in a raised position.

3. The combination of claim 2 wherein said means includes a stop member carried by the lever and engageable with a portion of said frame.

JOHN EAVES, Jr.
JAMES C. JONES.

REFERENCES CITED

The following references are of record in the file of this patent:

UNITED STATES PATENTS

| Number | Name | Date |
|---|---|---|
| 687,860 | Smart | Dec. 3, 1901 |
| 878,512 | Emerson | Feb. 11, 1908 |
| 1,120,875 | Wittler | Dec. 15, 1914 |
| 1,303,480 | Kelly | May 13, 1919 |
| 2,164,550 | Steward | July 4, 1939 |
| 2,399,304 | Watkins | Apr. 30, 1946 |

FOREIGN PATENTS

| Number | Country | Date |
|---|---|---|
| 127,960 | Germany | Jan. 30, 1902 |
| 886,493 | Germany | May 5, 1908 |